United States Patent
Bletz et al.

[11] Patent Number: 5,907,727
[45] Date of Patent: May 25, 1999

[54] DEVICE FOR EXPOSURE METERING

[75] Inventors: Walter Bletz; Robert Denk, both of Braunfels; Gerhard Kranz, Wetzlar; Rolf Magel, Fernwald-Steinbach, all of Germany

[73] Assignee: Leica Camera AG, Wetzlar, Germany

[21] Appl. No.: 08/914,764

[22] Filed: Aug. 20, 1997

[30] Foreign Application Priority Data

Aug. 20, 1996 [DE] Germany .......................... 196 33 553

[51] Int. Cl.⁶ .................................................. G03B 7/099
[52] U.S. Cl. ........................................... 396/270; 396/272
[58] Field of Search .................................... 396/270, 272, 396/268, 271, 233, 234

[56] References Cited

U.S. PATENT DOCUMENTS

| | | | |
|---|---|---|---|
| 3,872,484 | 3/1975 | Hashimoto et al. | 396/270 |
| 4,181,412 | 1/1980 | Holle et al. | 354/23 |
| 4,390,258 | 6/1983 | Mizokami | 354/24 |
| 5,006,879 | 4/1991 | Takagi et al. | 396/271 |

FOREIGN PATENT DOCUMENTS

| | | |
|---|---|---|
| 1 209 419 | 1/1966 | Germany . |
| 26 05 955 | 8/1977 | Germany . |
| 31 49 655 | 6/1982 | Germany . |

Primary Examiner—W. B. Perkey
Attorney, Agent, or Firm—Foley & Lardner

[57] ABSTRACT

A device for exposure metering in photographic cameras including a reflector located in the imaging beam path. The surface of the reflector is provided with a reflecting structure whose size corresponds at least approximately to that of the image recording format. At least one photoelectric receiver records the light intensity of a portion of the image reflected from the reflecting structure. The reflector is pivotally mounted in the camera housing such that during exposure metering the reflector surface is in the vicinity of the film plane of the camera. A limited portion of the reflector is transparent and a photoelectric receiver is set into the backside of the reflector behind the transparent portion.

22 Claims, 3 Drawing Sheets

DEVICE FOR EXPOSURE METERING

BACKGROUND OF THE INVENTION

1. Field of the Invention

The invention relates to a device for exposure metering in photographic cameras.

2. Description of Related Art

Photographic cameras with exposure metering through the image-recording objective are known. Conventional reflex cameras pivotally support a photoelectric receiver in front of the image plane for the exposure metering. The receiver has a limited recording area, so that only a portion of the image is utilized for metering. It is also known to provide a light-reflecting spot on the shutter curtain. The light reflected by the spot is converted into a metering signal by a photoelectric receiver arranged in the base of the camera housing. Integral metering over the entire image field of the exposure is not possible with conventional cameras.

DE 26 05 955 C2 discloses a reflex camera in which a reflector is provided with a grating structure which deflects imaging rays passing through the semitransparent reflex mirror toward a photoelectric receiver arranged in the camera base. The grating structure comprises a honeycomb mirror having a large number of convex or concave mirror elements of identical focal length. The mirror elements are inclined in such a way that the center of each individual element reflects the major rays toward the photoelectric receiver.

In addition, the reflector may have a slight curvature such that the marginal rays coming from the imaging objective are also reflected toward the photoelectric receiver.

The honeycomb mirror may be divided into a central mirror part which is used for spot metering and a larger part enclosing the central mirror part. The larger part enclosing the mirror part can optionally be connected to the smaller part for integral metering of the entire image field.

In the metering position, the reflector pivots into the imaging beam path of the camera. To take the picture, the reflector is folded out of the beam path together with the reflex mirror. Given the limited space available in the camera housing, the reflector must be configured as flat as possible, in order to be moved out of the imaging beam path.

The honeycomb elements scatter light, in an optimally diffuse manner, in the direction of the photoelectric receiver. The luminance of the area is proportional to the luminance of the object to be photographed, and proportional to the objective opening. Conventionally, single-part reflectors are used, and dividing the mirror into separate regions provides spot and integral metering.

A disadvantage of diffusely scattering the light with the reflector is a relatively small current is generated from the photoelectric receiver(s). Complicated electronics are necessary to amplify the current for the purpose of evaluating the measured signal.

DE 12 09 419 discloses a reflex camera in which a small-area photodiode is provided on a movable protective light flap in front of the shutter. The photodiode rests in a depression in the protective light flap and, for the purpose of metering, must be pivoted out of the depression into a position perpendicular to the imaging beam path. The arrangement of the photodiode directly behind the semitransparent reflex mirror generates acceptable photocurrents.

However, the depression interferes with the imaging beam path when the protective light flap is pivoted toward the reflex mirror during an exposure. In addition, the spot-like metering photodiode hampers fitting a metering system for the surrounding field, hence integral metering is not possible.

In addition to predefined constant object illumination, flash illumination is often provided. For a correct exposure, it is advantageous to measure the quantity of light directed by the flash onto the object before the exposure. Conventionally, this metering also occurs through the image-recording objective. Given the increased light provided for a brief period, a photodiode for spot metering can be used as a photoelectric convertor.

DE 31 49 655 C2 discloses a single circuit for metering both flash illumination and constant surrounding field illumination. The evaluation circuit can be switched such that, for flash illumination, the signal coming from the photodiode is integrated directly in the linear amplification range, and when metering the surrounding light, the signal is firstly logarithmically compressed.

SUMMARY OF THE INVENTION

An object of the invention is to significantly increase the light provided at the photoelectric receiver for spot metering under constant surrounding field illumination, as well as to provide integral metering for reflex cameras and for viewfinder cameras. Additionally, the invention provides flash exposure metering before taking the photograph.

An advantage of the invention is that during spot metering, in which a relatively small area of the image is used to generate current, it is possible to meter light reflected from the imaging beam path, without a diversion. According to the invention, the photocurrent generated is greater by about a factor of 30 relative to that from the central region of a multi-field receiver positioned in the bottom region of the camera. At the same time, integral metering can also be provided with this receiver. Compensation for the light intensity which is missing from the central field of the photoelectric multi-field receiver is provided by a weighted accounting of the signal from the receiver located in the reflector.

According to the invention, a reflector located in the vicinity of the image plane, also carries one or more photoelectric receivers. Since the reflector is pivoted out of the beam path before taking the picture, an additional movable carrier element for a photoelectric receiver is eliminated.

Because the spot receiver has a particularly flat construction, it may be set into the reflector, without increasing the reflector dimensions or interfering with the optical imaging beam path leading toward the focal plane. The spot receiver electrical connections can be directed laterally out of the receiver element via conductor tracks connected to flexible line wires which can likewise be integrated completely into the rear surface of the reflector.

The flexible line wires leave the reflector at the edge which is located proximate to the pivot axis of the reflector and then lead through the pivot axis for the reflector and/or the reflex mirror. Even with frequent folding up and down of the reflector and/or reflex mirror the flexible line wires experience only extremely small movements which minimizes the risk of breaking the wires.

According to the present invention, the evaluation circuit can be switched so that the spot receiver provides spot-like measuring-flash metering. The reflecting structure, including a photoelectrically sensitive area of the receiver defined by a first transparent portion of the reflecting structure, is located slightly in front of the focal plane, therefore very precise assignment of the measuring spot to an image detail is provided. The influences of stray light are negligible at this point, therefore no special compensating measures are necessary. A spectral filter located on the reflector mounted receiver matches the spectral sensitivity of the receiver to the usual exposure conditions for photographic recordings.

Receivers for integral metering, which are fitted in the bottom region of the camera housing, have to be protected in the usual way against influences of stray light. To improve evaluation of a TTL automatic flash unit, the invention advantageously provides two further photoelectric receivers arranged laterally beside the integral metering receiver arrangement. The further receivers have approximately the same area as the integral metering receiver. A beam-collecting optical system is arranged upstream of the integral metering receiver, and the further receivers intercept light collected by the optical system. The distribution of the additional receivers provides advantageous symmetrical sensitivity for integral flash exposure metering. Sensitivity matching may be further improved by connecting a spectral filter having a different transparency from the filter for the integrally metering receiver upstream of the further receivers.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description of the preferred embodiment given below, serve to explain the principles of the invention.

An exemplary embodiment of the device for exposure metering according to the invention is illustrated schematically in the drawings and is described in more detail below using the attached figures.

DETAILED DESCRIPTION OF THE PREFERRED EMBODIMENTS

Figure 1:
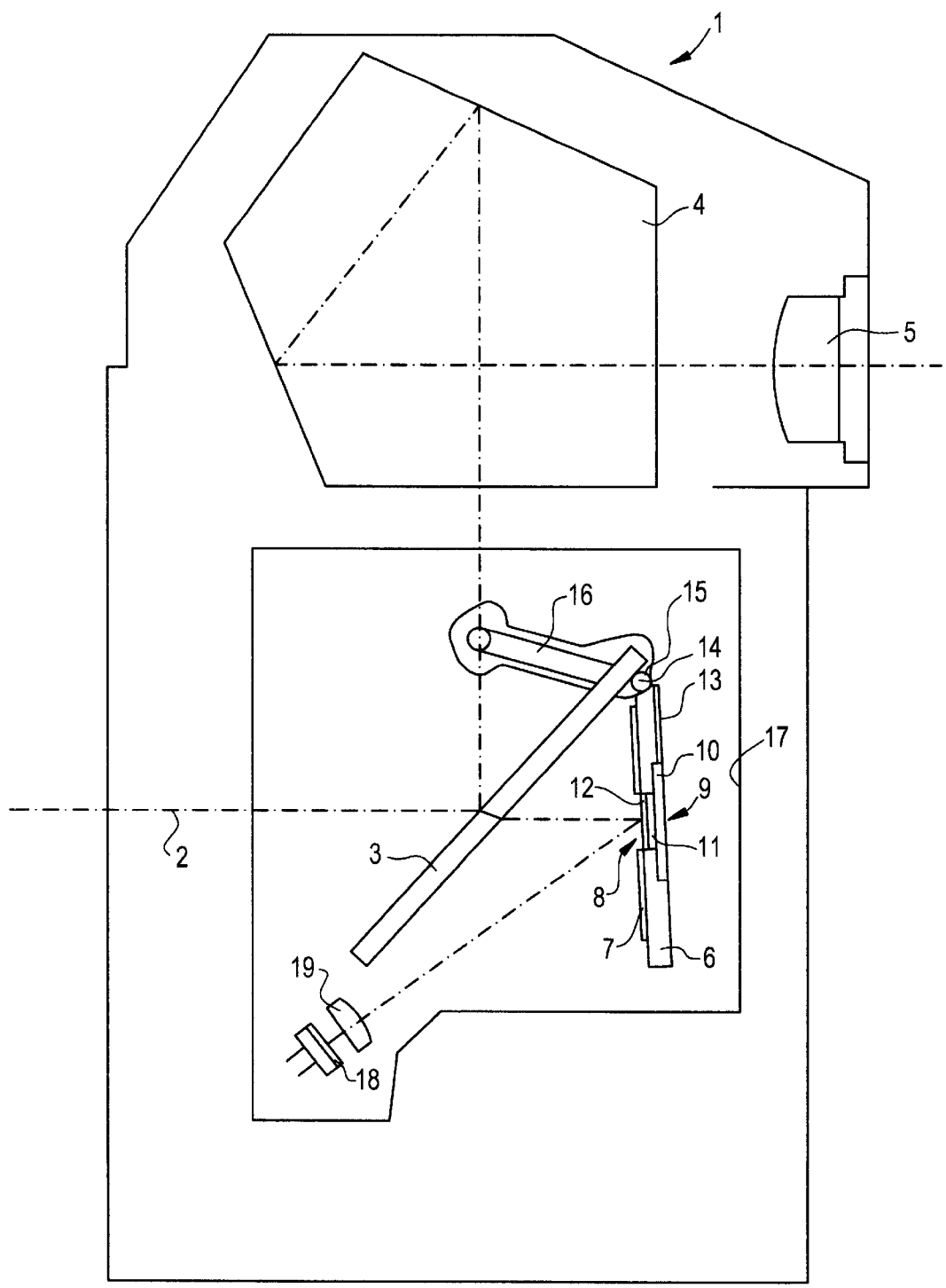
FIG. 1 shows a section through a reflex camera with a reflector according to the invention.

FIG. 1 shows in section a camera housing 1 of a reflex camera. The dash-dot line corresponds to the imaging beam path 2. The imaging beam path 2 is split by a semitransparent reflex mirror 3 so as to be deflected by a prism 4 to an eyepiece 5 and conducted through to a reflector 6. The reflector 6 comprises a reflecting structure 7 having a central transparent opening 8. A disk-shaped first photoelectric receiver 9 behind opening 8 is set flush into a recess on the rear surface of the reflector 6. The opening 8 is shown located at a region corresponding to the center of the image, and is therefore particularly suitable for spot metering. However, the opening 8 may be provided at other points on the reflector or as a combination of openings. The first photoelectric receiver 9 has a base plate 10, a photoelectrically sensitive receiving area 11 delimited by the opening 8, and a spectral filter 12. Line wires 13 from the first photoelectric receiver 9 are disposed flush at the rear surface of reflector 6 and emerge from an upper edge 14 proximate a tubular pivot axis 15 of the reflector 6.

The reflector 6 is shown articulated with respect to the reflex mirror 3, which can also be pivoted out of the imaging beam path on the same pivot axis 15. A pivoting mechanism 16 necessary for this is illustrated only schematically. In the case of a viewfinder camera, the reflex mirror 3 can be left out and the pivoting mechanism 16 can act solely on the reflector 6. The viewfinder eyepiece 5 is assigned its own beam path with a separate view out of the camera housing 1.

In the folded-out position illustrated in FIG. 1, the reflector 6 is positioned slightly in front of the focal plane 17, so that a roughly focused image of the object to be recorded is produced on the first photoelectric receiver 9. The transparent opening 8 has a circular cross-section and isolates a selected detail of the image. An unexpected result of the invention is that the image's slight lack of focus on the reflector 6 effectively compensates for areas of the square photoelectric receiver 9 which are not revealed through the circular opening 8. Therefore, it is possible to assume a measuring area which corresponds to the transparent opening 8, as will be discussed further in the description relating to FIG. 4.

A second portion of the imaging rays 2 which are incident on the reflecting structure 7 are deflected in a known way to a second photoelectric receiver 18 positioned in the base of the camera housing 1 and which is protected against stray light. An optical system 19 including a converging element for collecting the reflected imaging rays 2 is upstream of the second receiver 18.

Figure 2:
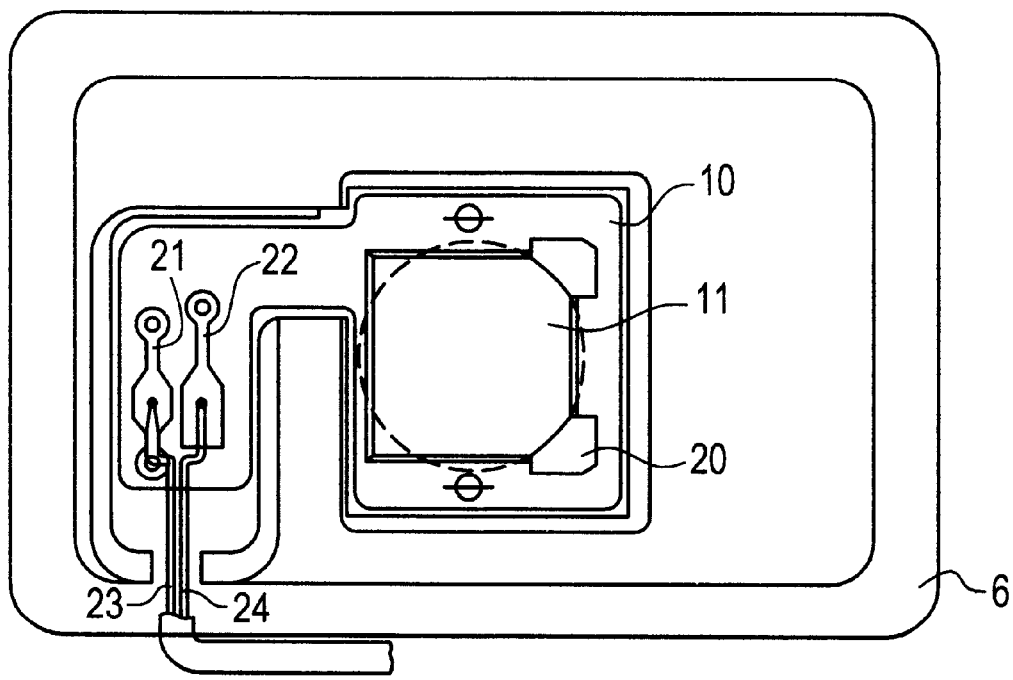
FIG. 2 shows a plan view of the rear of the reflector.

FIG. 2 shows the rear side of the reflector 6 having the base plate 10 of the first photoelectric receiver 9 set into a recess in the rear surface of the reflector 6. The square first receiver 9 is connected to the base plate 10 with corner retaining elements 20. The receiving area 11 is illustrated as a unitary element, however, the receiving area 11 can also be divided into separate receiving regions. The electrical connections which originate from the first receiver 9 are initially embedded under the rear surface of the base plate 10, with only solder connections 21,22 at the ends of the conductor tracks visible. Line wires 23,24 are also let into the rear surface of the base plate 10.

Figure 3:
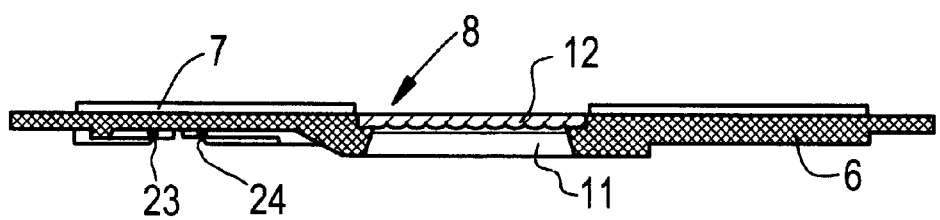
FIG. 3 shows a section through the reflector.

The very flat construction of the first photoelectric receiver 9 is shown by the cross-sectional illustration of FIG. 3. A protective covering over the features of the rear surface is not shown.

Figure 4:
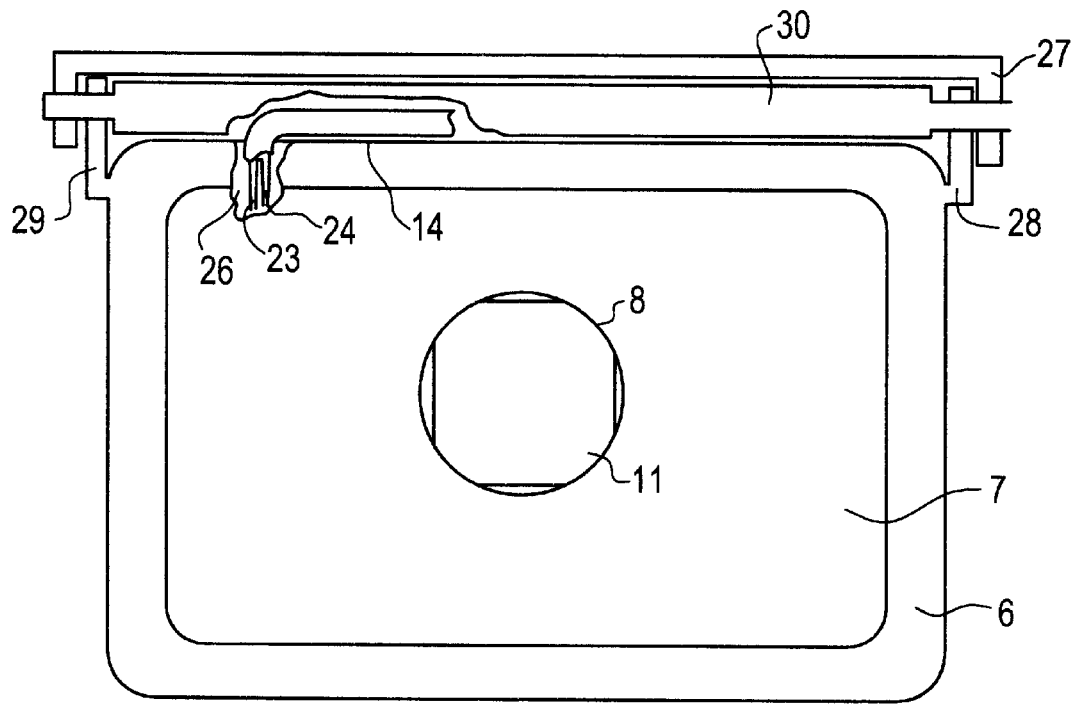
FIG. 4 shows a plan view of the front of the reflector.

FIG. 4 shows the front surface of the reflector 6, which carries the reflecting structure 7. The first photoelectric receiver 9 is located behind the transparent opening 8 in the reflecting structure 7. A square first receiver 9 was selected for production engineering reasons, however, other shapes are also envisioned. In order to make optimum use of the first receiver 11, the size of transparent opening 8 is selected such that at least all the corners of the first receiver 9 are retained by the reflecting structure 7. As a result, only the receiving area 11 portion of first receiver 9 is revealed through the transparent opening 8. As already mentioned, the slight lack of image focus on the reflector 6 compensates the metering for those portions of the image which would otherwise fall on the covered portions of first receiver 9.

The cut-away portion 26 illustrated at the upper edge 25 of the reflector 6 indicates how the line wires 23,24 are lead out of the reflector 6 so that they are subjected to minimal torsional movement. A carrier 27 fastened to the camera housing 1 pivotally supports both the reflector 6, via eyelets 28 and 29, as well as the reflex mirror 3, via a hollow axle 30. The line wires 23,24 are preferably lead out of the end of hollow axle 30 to provide the longest possible wire length for absorbing torsional movement.

Figure 5:
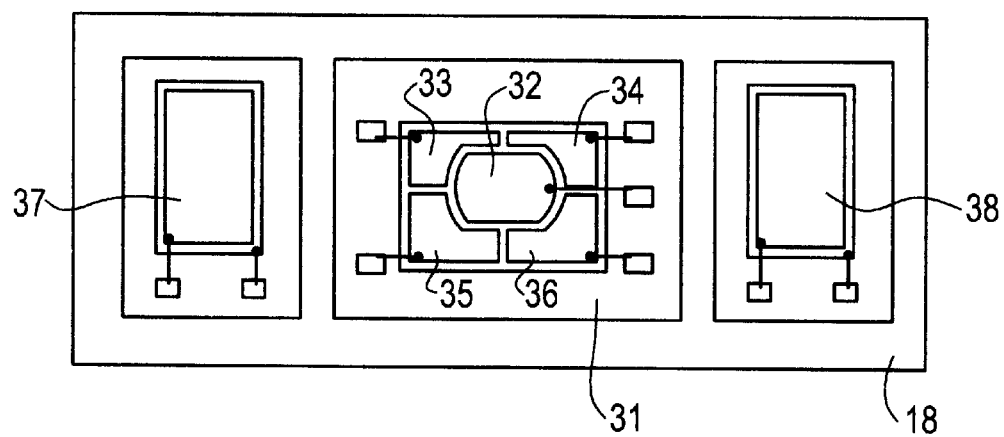
FIG. 5 shows a plan view of the receiver arrangement downstream of the reflector.

FIG. 5 shows the second photoelectric receiver 18 arranged in the base of camera housing 1. A central region 31 of the second receiver 18 is divided into a plurality of separate fields 32–36. Because the first photoelectric receiver 9 in the reflector 6 does not reflect a first portion of the imaging beam 2, the central field 32 receives less scattered light than a conventional arrangement without the first receiver 9. The central field 32 "sees" the region of the opening 8 in the reflector 6, through the optical system 19, as a sort of optical "black hole". That is to say, there is an absence of reflected light from that portion of reflector 6 which is occupied by the first receiver 9. Combining the signal generated by the light metered at the central field 32 with the signal from the receiver 9, with corresponding suitable weighting, fills the optical black hole created by the first receiver 9 in the reflector 6. All of the fields 32–36, in combination with the photoelectric receiver 9, provide integral metering.

When a measuring flash is used, significantly greater luminous flux is produced for a brief period as compared with constant surrounding field illumination. The inventors have discovered that the light components reflected by the light-scattering structures 7 have a scattering lobe with marginal intensity which also passes through the optical system 19 and must not be neglected for correct exposure metering. In order to measure all of these light components for metering, supplemental photoelectric receivers 37,38 are arranged symmetrically on opposite lateral sides of the second receiver 18. Taking into account these additional light components leads to significantly improved flash illuminated metering. To better adapt supplemental receivers 37,38 to the spectral light distribution in the measuring flash, it is expedient to connect a suitably matched spectral filter upstream of the supplemental receivers 37,38. The spectral filter for the supplemental receivers 37,38 may be different from the spectral filter upstream of the second receiver 18.

The electrical connecting points for the different photoelectric receivers are illustrated schematically with small boxes. The signal lines to be connected thereto are fed to an evaluation circuit (not shown) which combines the signals with one another in such a way that an exposure metering signal suitable for the desired recording situation is generated and, if appropriate, fed to an automatic exposure control system. An exposuremode switch on the camera (not shown) may include a special switch position for measuring flash metering which also switches the evaluation circuit to this operating mode.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The entire contents of German Priority Patent Application No. 196 33 553.1-51 (filed Aug. 20, 1996) is expressly incorporated herein by reference.

What is claimed is:

1. A device for exposure metering in a photographic camera which records at an image plane an image received along an imaging beam path, the device comprising:
   a reflector for positioning in the imaging beam path generally parallel and proximal to the imaging plane;
   a first photoelectric receiver for receiving a first portion of the image incident thereupon, said first photoelectric receiver being fixed with respect to said reflector; and
   a second photoelectric receiver for receiving a second portion of the image reflected from said reflector.

2. The device according to claim 1, further comprising:
   a mount for pivotally supporting said reflector with respect to a housing for the photographic camera.

3. The device according to claim 2, wherein said reflector is pivoted on said mount into the image beam path in front of a focal plane at which the image is recorded.

4. The device according to claim 1, wherein said reflector includes at least one transparent region, said first photoelectric receiver being fixed behind said at least one transparent region.

5. A device for exposure metering in a photographic camera which records an image received along an imaging beam path, the device comprising:
   a reflector for positioning in the imaging beam path, said reflector including at least one transparent region;
   a first photoelectric receiver for receiving a first portion of the image incident thereupon, said first photoelectric receiver set in said reflector behind said at least one transparent region; and
   a second photoelectric receiver for receiving a second portion of the image reflected from said reflector;
   wherein the image is incident on a front surface of said reflector and said first photoelectric receiver is set flush in a rear surface of said reflector.

6. The device according to claim 5, further comprising:
   at least one electrical conductor connected to said first photoelectric receiver, said at least one electrical conductor being set flush in said rear surface and extending to said pivotal mount, and said at least one electrical conductor further extending within said pivotal mount to said housing.

7. The device according to claim 4, wherein said transparent region is located coincident with a center of the image.

8. A device for exposure metering in a photographic camera which records an image received along an imaging beam path, the device comprising:
   a reflector for positioning in the imaging beam path;
   a first photoelectric receiver for receiving a first portion of the image incident thereupon, said first photoelectric receiver being fixed with respect to said reflector;
   a second photoelectric receiver for receiving a second portion of the image reflected from said reflector; and
   a semitransparent reflex mirror in the imaging beam path upstream of said reflector;
   wherein said reflector is pivotally articulated with respect to said semitransparent reflex mirror.

9. The device according to claim 1, further comprising:
   a first spectral filter in the imaging beam path upstream of said first photoelectric receiver.

10. The device according to claim 1, further comprising:
    an optical system for converging the reflected second portion of the image on said second photoelectric receiver.

11. The device according to claim 10, further comprising:
a second spectral filter in the reflected imaging beam path upstream of said second photoelectric receiver.

12. The device according to claim 1, wherein said second photoelectric receiver is divided into a plurality of receiving fields for receiving different parts of the reflected second portion of the image.

13. The device according to claim 12, further comprising:
a supplemental photoelectric receiver substantially adjacent to said second photoelectric receiver.

14. The device according to claim 13, wherein two supplemental photoelectric receivers are arranged symmetrically on opposite lateral sides of said second photoelectric receiver.

15. The device according to claim 13, wherein said second and supplemental photoelectric receivers are relatively similar, and said first photoelectric receiver is dissimilar with respect to said second and supplemental photoelectric receivers.

16. The device according to claim 13, further comprising:
a second spectral filter in the reflected imaging beam path upstream of said second photoelectric receiver; and
a supplemental spectral filter in the reflected imaging beam path upstream of said supplemental photoelectric receiver;
wherein said second and supplemental spectral filters are relatively dissimilar.

17. The device according to claim 13, further comprising:
an evaluation circuit for evaluating output signals from said first, second and supplemental photoelectric receivers;
wherein said evaluation circuit includes a switch position for measuring flash exposure metering.

18. The device according to claim 17, wherein said evaluation circuit combines said output signals from at least two of said first, second and supplemental photoelectric receivers.

19. The device according to claim 1, wherein the size of said reflector corresponds approximately to an image recording format.

20. A camera comprising:
a device for exposure metering, the device including
a reflector for positioning in an imaging beam path generally parallel and proximal to an imaging plane;
a first photoelectric receiver for receiving a first portion of the image incident thereupon, said first photoelectric receiver being fixed with respect to said reflector; and
a second photoelectric receiver for receiving a second portion of the image reflected from said reflector.

21. A device for exposure metering in a photographic camera which records an image received along an imaging beam path, the device comprising:
a reflector for positioning in the imaging beam path;
a first photoelectric receiver for receiving a first portion of the image incident thereupon, said first photoelectric receiver being fixed with respect to said reflector; and
a second photoelectric receiver facing said reflector for receiving a second portion of the image directly reflected from said reflector.

22. A camera comprising:
a device for exposure metering, the device including
a reflector for positioning in an imaging beam path;
a first photoelectric receiver for receiving a first portion of the image incident thereupon, said first photoelectric receiver being fixed with respect to said reflector; and
a second photoelectric receiver facing said reflector for receiving a second portion of the image directly reflected from said reflector.

* * * * *